(12) United States Patent
Clawson

(10) Patent No.: US 9,491,605 B2
(45) Date of Patent: *Nov. 8, 2016

(54) TEXT MESSAGING FOR EMERGENCY RESPONSE

(71) Applicant: Jeffrey J. Clawson, Salt Lake City, UT (US)

(72) Inventor: Jeffrey J. Clawson, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/083,810

(22) Filed: Mar. 29, 2016

(65) Prior Publication Data

US 2016/0212605 A1   Jul. 21, 2016

Related U.S. Application Data

(63) Continuation of application No. 14/169,302, filed on Jan. 31, 2014, now Pat. No. 9,319,859.

(60) Provisional application No. 61/759,312, filed on Jan. 31, 2013.

(51) Int. Cl.
*H04M 11/04* (2006.01)
*H04W 4/22* (2009.01)
(Continued)

(52) U.S. Cl.
CPC .......... *H04W 4/22* (2013.01); *H04L 12/1895* (2013.01); *H04M 1/72536* (2013.01);
(Continued)

(58) Field of Classification Search
CPC ............ H04M 1/72569; H04M 1/72572; H04M 3/5116; H04M 11/04; H04M 2242/16; H04M 3/4931; H04M 1/72536; H04M 1/72552; H04M 1/72561; H04M 1/72583; H04M 1/72591; H04M 2201/42; H04M 2242/04; H04M 3/4238; H04M 2203/357; H04M 1/7253; H04M 1/72541; H04M 2250/22; H04M 2201/50; G06F 17/30315; G06F 19/3431; G06F 11/3664; G06F 19/30; G06F 19/345; G06F 19/363; G06F 3/0481; H04W 4/22; H04W 76/007; H04W 4/021; H04W 64/00; H04W 40/20; H04W 4/14; H04W 88/02
See application file for complete search history.

(56) References Cited

U.S. PATENT DOCUMENTS 3,799,147 A   3/1974   Adolph et al.
4,130,881 A   12/1978  Haessler et al.
(Continued)

FOREIGN PATENT DOCUMENTS

CN   1674685 A    9/2005
CN   101169840 A  4/2008
(Continued)

OTHER PUBLICATIONS

Office Action Summary from USPTO for U.S. Appl. No. 10/140,635 mailed Jul. 16, 2004, 11 pgs.
(Continued)

*Primary Examiner* — Nimesh Patel
(74) *Attorney, Agent, or Firm* — John R. Thompson; Stoel Rives LLP

(57) ABSTRACT

Systems and methods are provided to guide an emergency dispatcher in responding to emergency communications. The systems and methods may allow the dispatcher to use one or more of a plurality of different communication methods to communicate with a person needing assistance, such as by sending and receiving SMS/MMS messages. The systems and methods can include an emergency police, emergency fire, and/or emergency medical dispatch protocol configured to facilitate rapid, uniform, and consistent handling of communications. The emergency dispatch protocol presents a pre-scripted interrogation, including preprogrammed inquiries for a dispatcher to ask the person needing assistance. The emergency dispatcher may be able to easily send preprogrammed inquiries to the person needing assistance via SMS/MMS message and provide their responses to the emergency dispatch protocol quickly and/or automatically. The dispatch protocol may facilitate quick deployment of responders even if the person needing assistance cannot talk and/or hear.

20 Claims, 5 Drawing Sheets

(51) Int. Cl.
  *H04M 3/42* (2006.01)
  *H04M 3/51* (2006.01)
  *H04L 12/18* (2006.01)
  *H04M 1/725* (2006.01)
  *H04W 4/14* (2009.01)
  *H04W 4/20* (2009.01)
  *H04W 4/12* (2009.01)
  *H04L 29/08* (2006.01)

(52) U.S. Cl.
  CPC ..... *H04M 3/42382* (2013.01); *H04M 3/5116* (2013.01); *H04M 3/5183* (2013.01); *H04W 4/14* (2013.01); *H04W 4/20* (2013.01); *H04L 67/28* (2013.01); *H04W 4/12* (2013.01)

(56) References Cited

U.S. PATENT DOCUMENTS

| | | |
|---|---|---|
| 4,164,320 A | 8/1979 | Irazoqui et al. |
| 4,237,344 A | 12/1980 | Moore |
| 4,290,114 A | 9/1981 | Sinay |
| 4,338,493 A | 7/1982 | Stenhuis et al. |
| 4,360,345 A | 11/1982 | Hon |
| 4,455,548 A | 6/1984 | Burnett |
| 4,489,387 A | 12/1984 | Lamb et al. |
| 4,731,725 A | 3/1988 | Suto et al. |
| 4,839,822 A | 6/1989 | Dormond et al. |
| 4,858,121 A | 8/1989 | Barber et al. |
| 4,865,549 A | 9/1989 | Sonsteby |
| 4,922,514 A | 5/1990 | Bergeron et al. |
| 4,926,495 A | 5/1990 | Comroe et al. |
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |
| 5,077,666 A | 12/1991 | Brimm et al. |
| 5,086,391 A | 2/1992 | Chambers |
| 5,109,399 A | 4/1992 | Thompson |
| 5,122,959 A | 6/1992 | Nathanson et al. |
| 5,193,855 A | 3/1993 | Shamos |
| 5,228,449 A | 7/1993 | Christ et al. |
| 5,253,164 A | 10/1993 | Holloway et al. |
| 5,255,187 A | 10/1993 | Sorensen |
| 5,291,399 A | 3/1994 | Chaco |
| 5,323,444 A | 6/1994 | Ertz et al. |
| 5,339,351 A | 8/1994 | Hoskinson et al. |
| 5,348,008 A | 9/1994 | Bornn et al. |
| 5,379,337 A | 1/1995 | Castillo et al. |
| 5,404,292 A | 4/1995 | Hendrickson |
| 5,410,471 A | 4/1995 | Alyfuku et al. |
| 5,423,061 A | 6/1995 | Fumarolo et al. |
| 5,438,996 A | 8/1995 | Kemper et al. |
| 5,441,047 A | 8/1995 | David et al. |
| 5,462,051 A | 10/1995 | Oka et al. |
| 5,471,382 A | 11/1995 | Tallman et al. |
| 5,502,726 A | 3/1996 | Fischer |
| 5,513,993 A | 5/1996 | Lindley et al. |
| 5,516,702 A | 5/1996 | Senyei et al. |
| 5,521,812 A | 5/1996 | Feder et al. |
| 5,536,084 A | 7/1996 | Curtis et al. |
| 5,544,649 A | 8/1996 | David et al. |
| 5,554,031 A | 9/1996 | Moir et al. |
| 5,590,269 A | 12/1996 | Kruse et al. |
| 5,594,638 A | 1/1997 | Iliff |
| 5,594,786 A | 1/1997 | Chaco et al. |
| 5,596,994 A | 1/1997 | Bro |
| 5,630,125 A | 5/1997 | Zellweger |
| 5,636,873 A | 6/1997 | Sonsteby |
| 5,650,995 A | 7/1997 | Kent |
| 5,660,176 A | 8/1997 | Iliff |
| 5,675,372 A | 10/1997 | Aguayo, Jr. et al. |
| 5,682,419 A | 10/1997 | Grube et al. |
| 5,684,860 A | 11/1997 | Milani et al. |
| 5,689,229 A | 11/1997 | Chaco et al. |
| 5,719,918 A | 2/1998 | Serbetciouglu et al. |
| 5,722,418 A | 3/1998 | Bro |
| 5,724,983 A | 3/1998 | Selker et al. |
| 5,734,706 A | 3/1998 | Windsor et al. |
| 5,745,532 A | 4/1998 | Campana, Jr. |
| 5,748,907 A | 5/1998 | Crane |
| 5,754,960 A | 5/1998 | Downs et al. |
| 5,759,044 A | 6/1998 | Redmond |
| 5,761,278 A | 6/1998 | Pickett et al. |
| 5,761,493 A | 6/1998 | Blakeley et al. |
| 5,764,923 A | 6/1998 | Tallman et al. |
| 5,787,429 A | 7/1998 | Nikolin, Jr. |
| 5,805,670 A | 9/1998 | Pons et al. |
| 5,809,493 A | 9/1998 | Ahamed et al. |
| 5,822,544 A | 10/1998 | Chaco et al. |
| 5,823,948 A | 10/1998 | Ross, Jr. et al. |
| 5,826,077 A | 10/1998 | Blakeley et al. |
| 5,832,187 A | 11/1998 | Pedersen et al. |
| 5,842,173 A | 11/1998 | Strum et al. |
| 5,844,817 A | 12/1998 | Lobley et al. |
| 5,850,611 A | 12/1998 | Krebs |
| 5,857,966 A | 1/1999 | Clawson |
| 5,901,214 A | 5/1999 | Shaffer et al. |
| 5,902,234 A | 5/1999 | Webb |
| 5,910,987 A | 6/1999 | Ginter et al. |
| 5,912,818 A | 6/1999 | McGrady et al. |
| 5,915,019 A | 6/1999 | Ginter et al. |
| 5,926,526 A | 7/1999 | Rapaport et al. |
| 5,933,780 A | 8/1999 | Connor et al. |
| 5,961,446 A | 10/1999 | Beller et al. |
| 5,962,891 A | 10/1999 | Arai |
| 5,964,700 A | 10/1999 | Tallman et al. |
| 5,986,543 A | 11/1999 | Johnson |
| 5,989,187 A | 11/1999 | Clawson |
| 5,991,730 A | 11/1999 | Lubin et al. |
| 5,991,751 A | 11/1999 | Rivette et al. |
| 6,004,266 A | 12/1999 | Clawson |
| 6,010,451 A | 1/2000 | Clawson |
| 6,022,315 A | 2/2000 | Iliff |
| 6,035,187 A | 3/2000 | Franza |
| 6,040,770 A | 3/2000 | Britton |
| 6,052,574 A | 4/2000 | Smith, Jr. |
| 6,053,864 A | 4/2000 | Clawson |
| 6,058,179 A | 5/2000 | Shaffer et al. |
| 6,074,345 A | 6/2000 | van Oostrom et al. |
| 6,076,065 A | 6/2000 | Clawson |
| 6,078,894 A | 6/2000 | Clawson et al. |
| 6,106,459 A | 8/2000 | Clawson |
| 6,112,083 A | 8/2000 | Sweet et al. |
| 6,115,646 A | 9/2000 | Fiszman et al. |
| 6,117,073 A | 9/2000 | Jones et al. |
| 6,118,866 A | 9/2000 | Shtivelman |
| 6,127,975 A | 10/2000 | Maloney |
| 6,134,105 A | 10/2000 | Lueker |
| 6,292,542 B1 | 9/2001 | Bilder |
| 6,370,234 B1 | 4/2002 | Kroll |
| 6,535,121 B2 | 3/2003 | Matheny |
| 6,594,634 B1 | 7/2003 | Hampton et al. |
| 6,607,481 B1 | 8/2003 | Clawson |
| 6,610,012 B2 | 8/2003 | Mault |
| 6,696,956 B1 | 2/2004 | Uchida et al. |
| 6,879,819 B2 | 4/2005 | Brooks |
| 6,901,397 B1 | 5/2005 | Moldenhauer et al. |
| 6,931,112 B1 | 8/2005 | McFarland et al. |
| 6,968,375 B1 | 11/2005 | Brown |
| 7,106,835 B2 | 9/2006 | Saalsaa |
| 7,194,395 B2 | 3/2007 | Genovese |
| 7,289,944 B1 | 10/2007 | Genovese |
| 7,428,301 B1 | 9/2008 | Clawson |
| 7,436,937 B2 | 10/2008 | Clawson |
| 7,438,301 B2 | 10/2008 | Schilling et al. |
| 7,645,234 B2 | 1/2010 | Clawson |
| 7,703,020 B2 | 4/2010 | Bhattaru |
| 7,783,586 B2 | 8/2010 | Friedlander et al. |
| 7,978,826 B2 | 7/2011 | Salafia et al. |
| 8,066,638 B2 | 11/2011 | Clawson |
| 8,081,951 B1 | 12/2011 | Blum |
| 8,103,523 B2 | 1/2012 | Clawson |
| 8,294,570 B2 | 10/2012 | Clawson |

(56) References Cited

U.S. PATENT DOCUMENTS

| | | | |
|---|---|---|---|
| 8,335,298 | B2 | 12/2012 | Clawson |
| 8,346,942 | B2 | 1/2013 | Ezerzer et al. |
| 8,355,483 | B2 | 1/2013 | Clawson |
| 8,396,191 | B2 | 3/2013 | Clawson |
| 8,417,533 | B2 | 4/2013 | Clawson |
| 8,488,748 | B2 | 7/2013 | Clawson |
| 8,494,868 | B2 | 7/2013 | Saalsaa |
| 8,670,526 | B2 | 3/2014 | Clawson |
| 8,712,020 | B2 | 4/2014 | Clawson |
| 8,873,719 | B2 | 10/2014 | Clawson |
| 8,971,501 | B2 | 3/2015 | Clawson et al. |
| 2002/0004729 | A1 | 1/2002 | Zak et al. |
| 2002/0106059 | A1 | 8/2002 | Kroll et al. |
| 2003/0028536 | A1 | 2/2003 | Singh et al. |
| 2003/0050538 | A1 | 3/2003 | Naghavi et al. |
| 2003/0187615 | A1 | 10/2003 | Epler |
| 2003/0195394 | A1 | 10/2003 | Saalsaa |
| 2003/0211856 | A1 | 11/2003 | Zilliacus |
| 2003/0212575 | A1 | 11/2003 | Saalsaa et al. |
| 2005/0015115 | A1 | 1/2005 | Sullivan et al. |
| 2005/0065813 | A1 | 3/2005 | Mishelevich et al. |
| 2006/0059423 | A1 | 3/2006 | Lehmann et al. |
| 2006/0122520 | A1 | 6/2006 | Banet et al. |
| 2006/0152372 | A1 | 7/2006 | Stout |
| 2006/0167346 | A1 | 7/2006 | Sarel |
| 2006/0173500 | A1 | 8/2006 | Walker et al. |
| 2006/0178908 | A1 | 8/2006 | Rappaport |
| 2006/0212315 | A1 | 9/2006 | Wiggins |
| 2006/0225213 | A1 | 10/2006 | Tomcany |
| 2007/0055559 | A1 | 3/2007 | Clawson |
| 2007/0112275 | A1 | 5/2007 | Cooke et al. |
| 2007/0116189 | A1 | 5/2007 | Clawson |
| 2007/0189480 | A1 | 8/2007 | Salafia et al. |
| 2007/0201664 | A1 | 8/2007 | Salafia et al. |
| 2008/0208801 | A1 | 8/2008 | Friedlander et al. |
| 2008/0310600 | A1 | 12/2008 | Clawson |
| 2009/0037374 | A1 | 2/2009 | Delia et al. |
| 2009/0168975 | A1 | 7/2009 | Clawson |
| 2009/0191529 | A1 | 7/2009 | Mozingo et al. |
| 2009/0233631 | A1 | 9/2009 | Butler, Sr. et al. |
| 2009/0276489 | A1 | 11/2009 | Ragno et al. |
| 2010/0004710 | A1 | 1/2010 | Kellum |
| 2010/0121156 | A1 | 5/2010 | Yoo |
| 2010/0152800 | A1 | 6/2010 | Walker et al. |
| 2010/0198755 | A1 | 8/2010 | Soll et al. |
| 2010/0257250 | A1 | 10/2010 | Salafia et al. |
| 2011/0050417 | A1 | 3/2011 | Piccioni |
| 2011/0064204 | A1 | 3/2011 | Clawson |
| 2011/0066002 | A1 | 3/2011 | Clawson |
| 2011/0099031 | A1 | 4/2011 | Nair |
| 2011/0205052 | A1 | 8/2011 | Clawson |
| 2011/0215930 | A1 | 9/2011 | Lee et al. |
| 2012/0066345 | A1 | 3/2012 | Rayan et al. |
| 2012/0171989 | A1 | 7/2012 | Matsuo et al. |
| 2012/0183128 | A1 | 7/2012 | Clawson |
| 2012/0207286 | A1 | 8/2012 | Clawson |
| 2012/0210271 | A1 | 8/2012 | Clawson |

FOREIGN PATENT DOCUMENTS

| | | |
|---|---|---|
| CN | 201117055 Y | 9/2008 |
| CN | 102714524 A | 10/2012 |
| EP | 2476092 A1 | 3/2011 |
| GB | 2471960 | 1/2011 |
| GB | 2478171 A | 8/2011 |
| GB | 2482741 A | 2/2012 |
| GB | 2489875 A | 10/2012 |
| JP | 2002-049693 | 2/2002 |
| JP | 2003-109162 A | 4/2003 |
| JP | 2003-187003 A | 7/2003 |
| JP | 2003-256963 A | 12/2003 |
| JP | 2010-033201 A | 12/2010 |
| KR | 10-2005-0085778 | 8/2005 |
| KR | 10-2006-0084866 | 7/2006 |
| KR | 2007-0043337 A | 4/2007 |
| KR | 10-2008-0004125 | 1/2008 |
| KR | 10-2009-0014837 A | 2/2009 |
| WO | WO2004/030259 | 4/2004 |
| WO | WO2005/039406 A1 | 5/2005 |
| WO | WO2006/015229 A2 | 2/2006 |
| WO | WO 2008/014398 A2 | 1/2008 |
| WO | WO2008/156876 A1 | 12/2008 |
| WO | WO2011/031383 | 3/2011 |
| WO | WO2012/108898 A1 | 8/2012 |

OTHER PUBLICATIONS

Office Action Summary from USPTO for U.S. Appl. No. 10/140,635 mailed Apr. 19, 2005, 11 pgs.

Office Action Summary from USPTO for U.S. Appl. No. 10/140,635 mailed Jan. 17, 2006, 13 pgs.

Office Action Summary from USPTO for U.S. Appl. No. 10/140,635 mailed Sep. 20, 2006, 15 pgs.

Office Action Summary from USPTO for U.S. Appl. No. 10/140,635 mailed Jun. 21, 2007, 15 pgs.

International Search Report for PCT/US2008/054987 filed on Feb. 26, 2008, and mailed on Oct. 8, 2008, 2 pgs.

Written Opinion of the International Searching Authority for PCT/US2008/054987 filed on Feb. 26, 2008, and mailed on Oct. 8, 2008, 9 pgs.

Notification of Transmittal of the International Search Report (2 pgs.) for PCT/US2009/040909, International Search Report, (2 pgs.), and Written Opinion (8 pgs.) mailed from International Searching Authority on Jun. 10, 2009.

International Search Report and Written Opinion for PCT/US09/48577, International filed Jun. 25, 2009, mailed from ISA Aug. 7, 2009, 9 pgs.

International Search Report and Written Opinion mailed Jan. 19, 2011 in PCT Application No. PCT/US2010/043308, filed Jul. 27, 2010.

International Search Report and Written Opinion mailed Jan. 19, 2011 in PCT Application No. PCT/US2010/043311, filed Jul. 27, 2010.

Office Action Summary from USPTO for U.S. Appl. No. 12/396,201 mailed Mar. 8, 2011, 23 pgs.

International Search Report and Written Opinion PCT/US2010/050402, filed on Sep. 27, 2010, and mailed from ISA on Apr. 27, 2011, 9 pgs.

Office Action Summary from USPTO for U.S. Appl. No. 12/268,963 mailed Jul. 29, 2011, 18 pgs.

International Preliminary Report of Patentability for PCT/US2009/048577 filed on Jun. 25, 2009 mailed Oct. 27, 2011, 7 pgs.

International Search Report and Written Opinion for PCT/US2011/042543 filed on Jun. 30, 2011, mailed from ISA on Feb. 9, 2012, 11 pgs.

International Search Report and Written Opinion for PCT/US2011/042582 filed on Jun. 30, 2011, mailed from ISA on Feb. 9, 2012, 8 pgs.

International Preliminary Report of Patentability for PCT/US2010/043308 filed on Jul. 27, 2010 mailed Mar. 22, 2012, 6 pgs.

International Preliminary Report of Patentability for PCT/US2010/043311 filed on Jul. 27, 2010 mailed Mar. 29, 2012, 6 pgs.

Office Action Summary from USPTO for U.S. Appl. No. 12/558,045 mailed Mar. 22, 2012, 9 pgs.

Office Action Summary from USPTO for U.S. Appl. No. 12/558,808 mailed Apr. 23, 2012, 9 pgs.

Office Action Summary from USPTO for U.S. Appl. No. 12/422,561 mailed Jul. 3, 2012, 21 pgs.

International Search Report and Written Opinion for PCT/US2012/021867 filed on Jan. 19, 2012, and mailed from ISA on Aug. 30, 2012, 8 pgs.

Office Action Summary from USPTO for U.S. Appl. No. 13/354,116 mailed Jan. 22, 2013, 9 pgs.

Office Action Summary from USPTO for U.S. Appl. No. 12/422,561 mailed Feb. 1, 2013, 26 pgs.

Notice of Allowance from USPTO for U.S. Appl. No. 13/026,055 mailed Jan. 24, 2013.

(56) References Cited

OTHER PUBLICATIONS

Notice of Allowance from USPTO for U.S. Appl. No. 10/255,901 mailed Feb. 20, 2013.
Nordberg, Marie, "Dispatch Disasters," Emergency Medicine, Aug. 1995.
Notice of Allowance from USPTO for U.S. Appl. No. 13/354,116 mailed Jun. 7, 2013.
Liferidge, Aisha T., et al., "Ability of Laypersons to Use the Cincinnati Prehospital Stroke Scale", Prehospital Emergency Care, Elsevier, vol. 8, No. 4, Oct. 1, 2004, pp. 384-387.
Office Action Summary from USPTO for U.S. Appl. No. 13/026,043 mailed Oct. 10, 2013.
International Preliminary Report of Patentability for PCT/US2011/042543 filed on Jun. 30, 2011 mailed Aug. 22, 2013, 7 pgs.
International Preliminary Report of Patentability for PCT/US2011/042582 filed on Jun. 30, 2011 mailed Aug. 22, 2013, 5 pgs.
Office Action Summary from USPTO for U.S. Appl. No. 13/605,501 mailed Nov. 18, 2013.
International Search Report and Written Opinion for PCT/US2013/055537 filed on Aug. 19, 2013 and mailed from ISA on Nov. 22, 2013.
Notice of Allowance from USPTO for U.S. Appl. No. 13/026,043 mailed Jan. 13, 2014.
Nor, a. Mohd, et al., "Agreement Between Ambulance Paramedic- and Physician-Recorded Neurological Signs With Face Arm Speech Test (FAST) in Acute Stroke Patients", http://stroke.ahajournals.org/content/35/6/1355, Apr. 29, 2004, visited Nov. 17, 2013, 3 pgs.
Clark University "Active Shooter Emergency Plan" Revised Jan. 11, 2013.
Notice of Allowance from USPTO for U.S. Appl. No. 13/605,501 mailed Mar. 6, 2014.
International Search Report and Written Opinion for PCT/US2014/011405 filed on Jan. 14, 2014 and mailed from ISA on Apr. 25, 2014.
International Search Report and Written Opinion for PCT/US2014/014029 filed on Jan. 31, 2014 and mailed from ISA on May 16, 2014.
Office Action Summary from USPTO for U.S. Appl. No. 13/755,793 mailed Jul. 21, 2014.
International Preliminary Report of Patentability for PCT/US2013/055537 filed on Aug. 19, 2013 mailed Mar. 19, 2015.
Notice of Allowance from USPTO for U.S. Appl. No. 12/422,561 mailed Dec. 9, 2014.
Notice of Allowance from USPTO for U.S. Appl. No. 13/755,793 mailed Sep. 22, 2014.
Non-Final Office Action for U.S. Appl. No. 14/169,302, filed Jan. 31, 2014, and mailed from the USPTO on Sep. 25, 2015, 46 pgs.
Notice of Allowance and Fee(s) Due for U.S. Appl. No. 14/169,302, filed Jan. 31, 2014, and mailed from the USPTO on Mar. 4, 2016, 13 pgs.
Non-Final Office Action for U.S. Appl. No. 14/723,947, filed May 28, 2016, and mailed from the USPTO on Mar. 31, 2016, 33 pgs.
Radosevich, Lynda, "Network holds sway on life, death," Computerworld, v27 n21, May 24, 1993, 2 pgs.
Harris, Roger, "Updated 911 Phone System Top Concern of Residents," Business First-Louisville, v9 n19 s1, Dec. 1992, 3 pgs.
"Geac Completes Software Install," Wireless Week, Nov. 18, 1996, 3 pgs.
"Dictaphone introduces Windows-based Computer-Aided Dispatch (CAD) system," Business Wire, Apr. 23, 1996, 2 pgs. (in commercial use in 1995).
Holroyd, Brian, et al., "Medical Control; Quality Assurance in Prehospital Care," JAMA, The Journal of American Medical Association, v256, n8, Aug. 1986, p. 1027-1031.
CBS web page News Story entitled "911 Operator: 'It's got to be Hell'", Mar. 31, 2006 (excerpts from 911 operators' actions during the attacks on Sep. 11, 2001), 3 pgs.
Best, Wendy, "999 United Emergency services share life-saving Role to boost response," Western Daily Press, WDP Severnside ed., May 27, 1999, 2 pgs.
Poellmitz, William C., "Wireless technology keeps public safety a step ahead," Nation's Cities Weekly, v21 n17, Apr. 27, 1998, 3 pgs.
Crowley, Mark, "Learning from CAD System Implementation," Communications, v29 n8, Aug. 1992, 5 pgs.
Anonymous, "Suburban Chicago towns centralize 911 services," Communications News, v31 n10, Oct. 1994, 2 pgs.
Office Action Summary from USPTO for U.S. Appl. No. 10/255,901 mailed Dec. 31, 2003, 8 pgs.
Office Action Summary from USPTO for U.S. Appl. No. 10/255,901 mailed Oct. 13, 2004, 8 pgs.
Office Action Summary from USPTO for U.S. Appl. No. 10/255,901 mailed Jun. 29, 2005, 7 pgs.
Advisory Action Before the Filing of an Appeal Brief from USPTO for U.S. Appl. No. 10/255,901 mailed Feb. 14, 2006, 3 pgs.
Office Action Summary from USPTO for U.S. Appl. No. 10/255,901 mailed Jun. 7, 2006, 8 pgs.
Office Action Summary from USPTO for U.S. Appl. No. 10/255,901 mailed Feb. 27, 2007, 8 pgs.
Office Action Summary from USPTO for U.S. Appl. No. 10/255,901 mailed Sep. 6, 2007, 9 pgs.
Office Action Summary from USPTO for U.S. Appl. No. 10/255,905 mailed May 19, 2004, 7 pgs.
Office Action Summary from USPTO for U.S. Appl. No. 10/255,905 mailed May 26, 2005, 5 pgs.
Office Action Summary from USPTO for U.S. Appl. No. 10/255,905 mailed Feb. 9, 2006, 8 pgs.
Advisory Action Before the Filing of an Appeal Brief from USPTO for U.S. Appl. No. 10/255,905 mailed Aug. 11, 2006, 3 pgs.
Office Action Summary from USPTO for U.S. Appl. No. 10/255,905 mailed Jan. 30, 2007, 7 pgs.
Notice of Non-Compliant Amendment (37 CFR 1.121) from USPTO for U.S. Appl. No. 10/255,905 mailed Jul. 9, 2007, 4 pgs.
Office Action Summary from USPTO for U.S. Appl. No. 10/255,905 mailed Oct. 5, 2007, 7 pgs.
Office Action Summary from USPTO for U.S. Appl. No. 09/685,697 mailed Jul. 18, 2003, 8 pgs.
Office Action Summary from USPTO for U.S. Appl. No. 09/685,697 mailed Feb. 3, 2004, 5 pgs.
Office Action Summary from USPTO for U.S. Appl. No. 09/685,697 mailed Jan. 4, 2005, 5 pgs.
Office Action Summary from USPTO for U.S. Appl. No. 09/685,697 mailed Oct. 4, 2005, 7 pgs.
Advisory Action Before the Filing of an Appeal Brief from USPTO for U.S. Appl. No. 09/685,697 mailed Mar. 13, 2006, 4 pgs.
Office Action Summary from USPTO for U.S. Appl. No. 09/685,697 mailed Jun. 26, 2006, 8 pgs.
Office Action Summary from USPTO for U.S. Appl. No. 09/685,697 mailed Apr. 10, 2007, 9 pgs.
Office Action Summary from USPTO for U.S. Appl. No. 09/685,697 mailed Oct. 9, 2007, 11 pgs.
Office Action Summary from USPTO for U.S. Appl. No. 10/140,635 mailed Oct. 3, 2003, 9 pgs.

TEXT MESSAGING FOR EMERGENCY RESPONSE

RELATED APPLICATIONS

This application is a continuation of U.S. patent application Ser. No. 14/169,302, filed Jan. 31, 2014, and titled "SYSTEM AND METHOD FOR TEXT MESSAGING FOR EMERGENCY RESPONSE," now published as U.S. Patent Publication 2014/0213212, which claims the benefit under 35 U.S.C. §119(e) of U.S. Provisional Patent Application 61/759,312, filed Jan. 31, 2013, and titled "TEXT MESSAGING FOR EMERGENCY RESPONSE," the entire disclosure of each of which is hereby incorporated herein by reference.

COPYRIGHT NOTICE

©2014 Priority Dispatch Corp. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to computer systems and methods for providing emergency protocol interrogation, instruction, and dispatch. More specifically, the disclosure is directed to systems and methods for sending SMS/MMS messages to and/or receiving SMS/MMS messages from a person needing assistance while guiding a dispatcher during interrogation and instruction of the person needing assistance.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
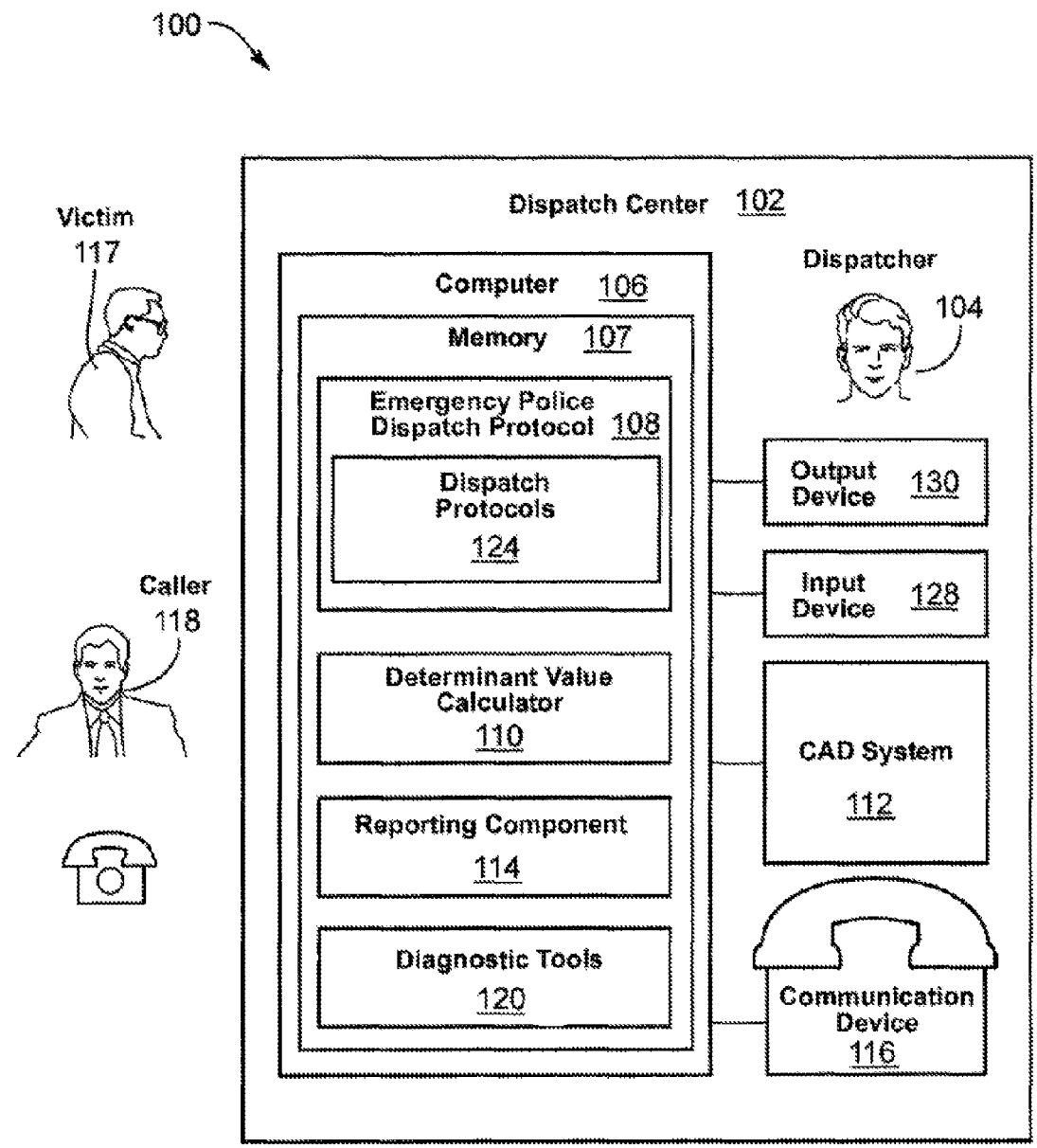
FIG. 1 is a block diagram of an emergency police dispatch system, according to one embodiment.

Emergency dispatchers may serve a critical role as the first and/or only persons to interface with a person needing assistance (e.g., a person contacting, calling, and/or sending short messaging service (SMS) and/or multimedia messaging service (MMS) messages to an emergency dispatch center). In their role of receiving emergency communication, emergency dispatchers are in a unique position and may potentially contribute to more positive outcomes by providing a person needing assistance with critical lifesaving instructions and by conducting a precise interrogation to gather specific information that will assist police officers in determining the appropriate response. Unfortunately, often emergency dispatchers are inexperienced and unskilled, largely due to a high turnover rate among emergency dispatchers.

An automated emergency dispatch system, potentially implemented on a computer, can aid even an unskilled and inexperienced dispatcher in prioritizing emergency communications (e.g., emergency calls, emergency messages, etc.) that are received and in processing the communications to generate an appropriate emergency dispatch response. Regardless of the experience or skill level of the dispatcher, the automated emergency dispatch system can enable a consistent and predictable emergency dispatch response, despite the diverse aspects of emergency situations that may be reported from one communication to the next.

In some situations, SMS/MMS may be the only, safest, and/or most convenient way to contact an emergency dispatch center. For example, a person needing assistance may be hearing impaired, and/or the person needing assistance may not be able to talk due to a hostile assailant in the area, extreme background noise, a lack of oxygen (e.g., asthma or choking), or the like. MMS may also be able to provide information that cannot be conveyed in a phone call and/or SMS message, such as a picture of a suspect and/or a video of an incident in progress. Unfortunately, existing emergency dispatch centers may be poorly equipped to receive and/or send SMS/MMS messages. Additionally, even if a dispatch center is able to receive and/or send SMS/MMS messages, the SMS/MMS messaging capability may not be integrated with automated emergency dispatch systems.

In many emergency situations, speed is of the essence. Delays of seconds or minutes may lead to a poorer outcome for a person needing assistance. Having to copy and/or transcribe every question and/or response between an automated emergency dispatch system and an SMS/MMS messaging system may result in such delays. An automated emergency dispatch system could save time and/or effect better outcomes by being able to send questions and/or receive responses automatically and/or with little operator effort.

The automated emergency dispatch system may be configured to send SMS/MMS messages itself and/or may be communicatively coupled with a messaging system that can be instructed by the automated emergency dispatch system to send SMS/MMS messages. The automated emergency dispatch system may be configured to automatically transmit preprogrammed inquiries via SMS/MMS message to a person needing assistance who has contacted the emergency dispatch center, and/or the automated emergency dispatch system may transmit the preprogrammed inquiries via SMS/MMS message in response to an input by a dispatcher. To save time, the automated emergency dispatch system may transmit the SMS/MMS message in response to no more than zero, one, two, three, or four actions by the dispatcher. For example, the dispatcher may be able to select the preprogrammed inquiry to be sent by right-clicking on the preprogrammed inquiry to bring up a menu and clicking on a "send SMS" command in the menu. Alternatively, or in addition, the actions may be single key-strokes. The dispatcher may not be required to type an entire question and/or required to copy and paste the question.

The automated emergency dispatch system may be configured to shorten the preprogrammed inquiries prior to sending the SMS/MMS message, for example, by replacing one or more words with common abbreviations. Similarly, the automated emergency dispatch system may instruct the person needing assistance regarding abbreviations that can be used in a responsive SMS/MMS message, such as, instructing the person needing assistance to transmit a "1" for yes and a "2" for no. In some embodiments, the automated emergency dispatch system may automatically select a preprogrammed answer to the preprogrammed inquiry based on the responsive SMS/MMS message from the person needing assistance. For example, the automated emergency dispatch system may recognize that the numeral "1" was sent in response and that this represents a "yes" response. The automated emergency dispatch system may indicate the automatically selected preprogrammed answer to the dispatcher and may require confirmation of the selected preprogrammed answer before proceeding to the next preprogrammed inquiry.

The automated emergency dispatch system may log all SMS/MMS messages sent and received by the system. For example, the automated emergency dispatch system may store a time stamp for each message and/or the contents (e.g., text, photo, video, etc.) of each message to a persistent storage device. The automated emergency dispatch system may ensure that SMS/MMS messages are properly routed to and from people needing assistance. In some embodiments, the automated emergency dispatch system may be coupled to a computer network. The automated emergency dispatch system may then translate a telephone number for the person needing assistance to a computer network address and/or may determine the computer network address from a message (e.g., from the header of a message) received from the person needing assistance. The automated emergency dispatch system may automatically register its own computer network address with one or more telephone service providers so SMS/MMS messages from people needing assistance are sent to the appropriate emergency dispatch center.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory storage device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

An emergency dispatch system as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems. The memory may also store application programs including a Computer Aided Dispatch (CAD) program, an automated emergency dispatch protocol, and a user interface program. The memory may also include data storage. The computer may further include an output device, such as a display unit, for viewing the displayed instructions and inquiries and a user input device for inputting response data.

FIG. 1 is an emergency police dispatch system 100, according to one embodiment. At a dispatch center 102, a dispatcher 104 may operate a computer 106 or other computing device. The computer 106 may include a memory 107 to store protocols, modules, tools, data, etc. The computer 106 may be configured to follow an emergency police dispatch protocol 108 to enable the dispatcher 104 to rapidly and consistently address an emergency incident involving a crime, or otherwise requesting law enforcement, as reported by a person needing assistance 118. An emergency communication requesting law enforcement may report an incident that may involve a victim 117. As can be appreciated, in some circumstances and/or incidents, the person needing assistance 118 is the victim 117. In other instances the person needing assistance may be a 2nd party (e.g., a person with the victim 117), 3rd party (e.g., a person not in the immediate vicinity of the victim 117), 4th party (e.g., a reporting or referral agency), or the suspect (or perpetrator). The emergency police dispatch protocol 108 may include a logic tree, preprogrammed inquiries or questions, possible responses from a person needing assistance 118 to the inquiries, and instructions to the person needing assistance 118. The responses may route to subsequent preprogrammed inquiries and/or instructions to the person needing assistance 118. The emergency police dispatch protocol 108 may also include dispatch protocols 124 for guiding the dispatcher 104 in processing emergency communications involving specific situations and/or incidents. The dispatch protocols 124 may similarly include a logic tree, preprogrammed inquiries or questions, possible responses from the person needing assistance 118 to the preprogrammed inquiries, and instructions for the person needing assistance 118. It should be understood that although an emergency police dispatch protocol 108 is included in the illustrated embodiment, other dispatch protocols, such as an emergency fire dispatch protocol and/or an emergency medical dispatch protocol, may be included in other embodiments, and the victim 117 may instead be a patient.

The responses of the person needing assistance 118 are processed according to predetermined logic of the logic tree of the emergency police dispatch protocol 108. The predetermined logic may enable the emergency police dispatch system 100 to provide to the dispatcher 104 information concerning the correct emergency police dispatch response (e.g., by trained law enforcement officers or agencies and/or other emergency responders). The predetermined logic may also enable the emergency police dispatch system 100 to provide to the dispatcher 104 appropriate post-dispatch instructions for relay to the person needing assistance 118 before professional help arrives at the scene. The predetermined logic may also enable the emergency police dispatch system 100 to aid the dispatcher 104 in determining an appropriate priority of the emergency communication, including but not limited to a priority of the emergency communication relative to other emergency communications and a level of emergency response to provide for the reported incident or situation.

Although an emergency police dispatch system 100 is disclosed and described herein, a person of ordinary skill can appreciate that other emergency dispatch systems and protocols are contemplated, including but not limited to emergency medical dispatch systems and protocols and emergency fire dispatch systems and protocols. Exemplary embodiments of emergency dispatch systems and protocols are disclosed in U.S. Pat. Nos. 5,857,966; 5,989,187; 6,004,266; 6,010,451; 6,053,864; 6,076,065; 6,078,894; 6,106,459; 6,607,481; 7,106,835; 7,428,301; 7,436,937; 7,645,234; 8,066,638; 8,103,523; 8,294,570; 8,335,298; and 8,355,483, which are hereby incorporated herein by reference.

The computer 106 operates a determinant value calculator 110 to calculate a determinant value from the responses of the person needing assistance 118 to protocol questions. The determinant value may be selected from a group of pre-established determinant values, such that the emergency responders are familiar with the determinant values and understand the meaning of each and what would be a corresponding emergency response. For example, the determinant values may range, for example, from E-1 for generally very serious emergencies to Ω-2 for generally less serious emergencies. The determinant value may provide a categorization code of the type and level of the incident.

In one embodiment of the present disclosure, the determinant value is a combination of a determinant level (Alpha A, Bravo B, Charlie C, Delta D, Echo E and Omega Ω) and a numeric value. Generally, Ω-2 is the least serious while E-1 is the most serious communication. Depending on the determinant level, the appropriate emergency response is dispatched as indicated by the response protocol. For example, an Alpha-A communication will typically be responded to by a next-available law enforcement unit using the safest arrival method reasonably possible. A Delta-D communication will typically be responded to by any or all available law enforcement units proceeding under the most urgent method possible. Echo-E communications typically involve likely immediate life-threatening situations and will be responded to in the most urgent manner available. Bravo-B and Charlie-C communications are intermediate emergencies that are typically responded to in business-like, orderly manner according to specific department protocol. An Omega-Ω communication is generally not specifically responded to, but rather is referred to another person or agency. For the purposes of this disclosure, Echo-E is generally abbreviated as E; Delta-D is generally abbreviated as D; Charlie-C is generally abbreviated as C; Bravo-B is generally abbreviated as B; Alpha-A is generally abbreviated as A; and Omega-Ω is generally abbreviated as Ω. Generally, the lower determinant levels (e.g., numbers) within a determinant classification are more urgent than higher numbers. For example, an emergency dispatch communication with a determinant value of D-1 is generally more critical and requires a more urgent response than a communication with a determinant value of D-2. However, in some instances, the numeric determinant levels within a determinant value may serve only to identify the type, rather than criticality of the communication. Also, if more than one determinant value can be assigned to a particular communication, the more critical or higher determinant value is assigned. That is, the communication is assigned a criticality determinant value based on the fact or aspect that would lead to the most urgent response. For example, if the communication concerns a burglary that occurred over 30 minutes before, but where the suspect remains on the scene or nearby and the person needing assistance 118 indicates that he or she is still in danger and feels his or her life is in imminent danger, then the determinant value assigned would be E-1 (due to the imminent danger) rather than D-2 (suspect on scene or nearby) or B-1 (incident occurred over 30 minutes before).

Many communications for law enforcement are not true emergencies, so it is important to prioritize the communications in several ways. First, communications that are true emergencies should be dispatched first. Second, if an agency has units with different capabilities, the emergencies involving more severe problems can be sent units that are more skilled and advanced (e.g., a S.W.A.T. team or bomb squad). And finally, if lights and siren are not needed, they should not be used, thereby increasing the safety of all those on the road and in the emergency response vehicles. The computer 106 presents the determinant value to generate an appropriate emergency dispatch response and/or establish the priority of the emergency communication. The response may include dispatching professional law enforcement officers or other emergency responders to the scene of the emergency. The protocols used shall have passed through a rigorous review by a panel of experienced law enforcement agents and EMS public safety experts.

The determinant value may be provided to a Computer Aided Dispatch (CAD) system 112, which is a tool that a dispatcher 104 may use to track and allocate emergency response resources for processing emergency communications. The CAD system 112 may manage dispatcher tools for processing emergency communications, including but not limited to the emergency police dispatch protocol 108, responder communication resources (e.g., radio system, alpha pager), mapping tools (e.g., global positioning system (GPS) technology, geographic information systems (GIS)), and vehicle location systems (e.g., automatic vehicle location (AVL)). The CAD system 112 may operate in whole or in part on a separate computer in communication with the computer 106. In another embodiment, the CAD system 112 operates on the computer 106. The primary information used by the CAD system 112 is location information of the incident and units, unit availability, and the type of incident. The CAD system 112 may use third party solutions, such as E-911, vehicle location transponders, and mobile data terminals (MDTs) for automating the location and availability tasks. The CAD 112 system may also use an emergency police dispatch protocol 108 to facilitate structured communication for incident interrogation, as previously described.

Although many emergency communications are not true emergencies, all situations can benefit from expert evaluation and pertinent instruction. Prior to the arrival of professional help on-scene, the emergency police dispatch protocol 108 may provide the dispatcher 104 with instructions for the person needing assistance 118 that are appropriate to the type of communication, whether the communication relates to a complaint of vandalism or to a homicide. These instructions may help expedite the work of law enforcement officers and/or other emergency responders.

The computer 106 may include a reporting component 114 to statistically measure the performance of individual staff and overall performance of the dispatch center 102. To record information received during a communication, the dispatcher 104 may be required to open a new case. Once the communication is complete, the dispatcher 104 may close the case, and a case summary may be saved. The case summary may be retrieved later for review and/or analysis. The reporting component 114 may determine statistics from the case summaries and/or while the cases are open. The statistics may include compliance rates, call/communication processing statistics, and peer measurements.

The computer 106 may further comprise an input device 128, such as a keyboard, mouse, touch screen, laser pointer, or other input device, and also an output device 130, such as a display monitor. The input device 128 receives input from a user (generally the dispatcher 104) and provides the input to the emergency police dispatch system 100. The input may be provided to the computer 106, the emergency police dispatch protocol 108, a diagnostic tool 120, and/or the CAD system 112. The output device 130 receives output from the emergency police dispatch system 100 and displays or otherwise provides the output to the user. In another embodiment, the input device 128 and output device 130 are provided by the CAD system 112.

The dispatch center 102 includes a communication device 116 (e.g., telephone equipment) to answer emergency communications. The communication device 116 may be configured to send and/or receive communications using one or more different methods and may include a telephone coupled to a public switch telephone network (PSTN) (e.g., a landline telephone); a telephone coupled to a computer network (e.g., a VoIP telephone); a telephone configured to communicate via radio waves (e.g., a mobile phone); a system, which may or may not include a telephone, configured to send and/or receive SMS and/or MMS messages via a PSTN, a computer network and/or radio waves; and/or the like. The communication device 116 may include multiple communication systems, such as a landline telephone and a system configured to send and receive SMS/MMS messages via a network. As can be appreciated, the particular methods of communication used may change as technology evolves. Some and/or all of the communication device 116 may be implemented on the computer 106 (e.g., when communicating via a computer network). Alternatively, the communication device 116 may be coupled to the computer 106.

The communication device 116 may be configured to determine a computer network address (e.g., an internet protocol address, email address, etc.) corresponding to a telephone number of the person needing assistance 118. For example, the communication device 116 may determine a telephone service provider based on the telephone number and may construct the computer network address based on the phone service provider and the telephone number. Alternatively, or in addition, the communication device 116 may determine the computer network address based on a source address specified in a communication from the person needing assistance 118. The communication device 116 may register a computer network address of the communication device 116 so SMS/MMS messages are properly routed by the telephone service providers. For example, the communication device 116 may inform the telephone service providers and/or a third party of one or more telephone numbers, telephone number ranges, telephone exchanges, and/or geographic areas that are serviced by the emergency dispatch center 102 and the computer network address that should be used to contact the emergency dispatch center 102.

A message interface component (not shown) may be a component of an automated emergency dispatch system. The message interface component 122 may enable the emergency police dispatch protocol 108, determinant value calculator 110, reporting component 114, diagnostic tools 120, and/or dispatch protocols 124 to interact with the communication device 116. In some embodiments, the message interface component 122 may also or instead be a component of the communication device 116 and/or may itself be able to send communications to and/or receive communications from the person needing assistance 118. The message interface component 122 may also be able to translate sent and/or received communications by using and/or deciphering common and/or custom abbreviations, shorthand, and/or the like. For example, a person needing assistance 118 may be instructed to respond to a question by sending an SMS containing "1" for an answer of yes and "2" for an answer of no and/or by dialing the same on their telephone keypad. The message interface component 122 may translate the received SMS and/or dual-tone multi-frequency (DTMF) signal into the corresponding answer.

A communication received at the dispatch center 102 from a person needing assistance 118 may initiate creation of an emergency communication incident. The dispatcher 104 identifies the communication as requiring an emergency police dispatch, and the emergency police dispatch protocol 108 is accessed. The protocol 108, including the dispatch protocols 124, may provide questions and/or instructions that are expertly drafted to assist a novice person needing assistance 118 in reporting aspects of the incident, and/or assessing a situation of a victim 117. The protocol 108 may also provide expertly drafted instructions to assist a victim 117 prior to the arrival of trained law enforcement and/or emergency responders. The instructions may be vocally relayed and/or sent as one or more SMS/MMS messages by the dispatcher 104 to the person needing assistance 118 over the communication device 116.

Some protocol inquiries or questions may be readily answerable by the person needing assistance 118, whereas others may be more difficult to answer. Certain diagnostic inquiries may be difficult for the untrained person needing assistance 118 to determine or may be difficult to answer under the stress of an emergency situation. Accordingly, in addition to instructions, the emergency police dispatch system 100 may provide one or more computer-implemented diagnostic tools 120. The diagnostic tools 120 may greatly improve information collection and intervention for emergency police response situations and aid in saving lives.

A diagnostic tool 120 may aid the dispatcher 104 and/or the person needing assistance 118 (via instructions from the dispatcher 104) in assessing a situation of a victim 117. A diagnostic tool 120 may also be an interventional tool, providing instructions that direct a person needing assistance 118 to intervene, or take action, to aid a victim 117, or otherwise change the circumstances or conditions of an emergency situation. For sake of clarity, diagnostic tools and interventional tools are both referred to herein generally as diagnostic tools. Accordingly, a diagnostic tool 120, as referred to herein, may provide diagnostic instructions, interventional instructions, or both diagnostic and interventional instructions. Whether a diagnostic tool 120 provides merely diagnostic instructions, merely interventional instructions, or both diagnostic and interventional instructions, the diagnostic tool 120 provides consistent and reliable instruction, information gathering, and/or timing for a particular emergency situation.

The diagnostic tools 120 are computer-implemented software modules that enable a dispatcher 104 to provide consistent, expert advice to assist a person needing assistance 118 with regard to a particular aspect of an emergency situation, such as determining a vital sign. One benefit of the diagnostic tools 120 is the computer-aided timing of techniques to determine the vital signs. In highly stressful conditions, the diagnostic tools 120 provide a necessary resource to reading critical signs. The diagnostic tools 120 may be stored in the memory of the computer 106 and initiated and executed as required. The diagnostic tools 120 may be embodied as computer-executable software applications and associated data.

The emergency police dispatch protocol 108, including the dispatch protocols 124, also may call on one or more diagnostic tools 120 to assist with an inquiry and may route to the appropriate diagnostic tool 120 when needed. When directed according to the protocol, the emergency police dispatch protocol 108 may automatically, i.e., without dispatcher intervention, initiate the appropriate diagnostic tool 120. This may occur when the emergency police dispatch protocol 108 arrives at a diagnosis or assessment step in the logic tree. The emergency police dispatch system 100 may also allow the dispatcher 104 the option to call upon a diagnostic tool 120 as desired. Icons may be displayed in a tool bar or other convenient location on a user interface to allow the dispatcher 104 to initiate a corresponding diagnostic tool 120.

Figure 2:
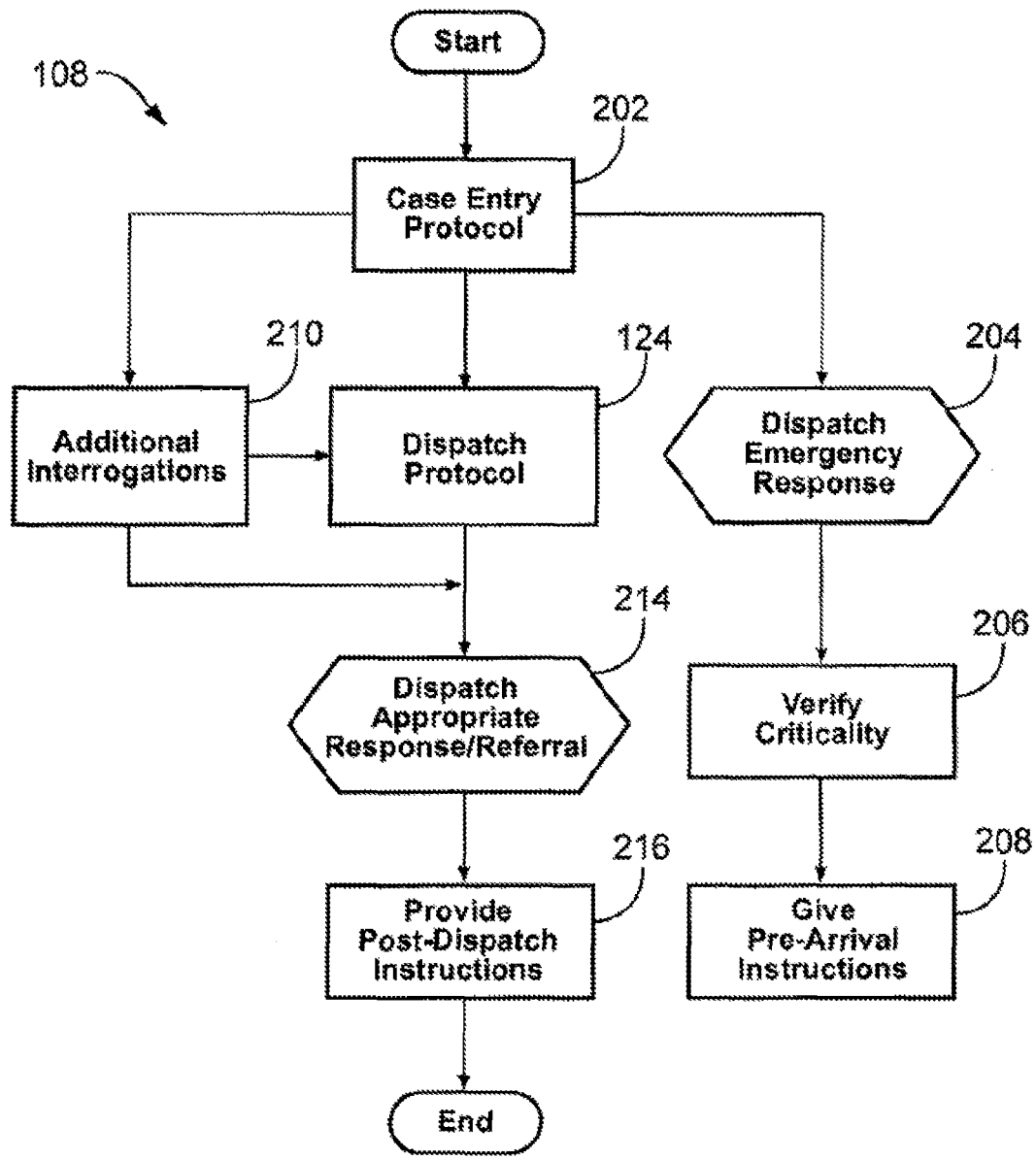
FIG. 2 is a flow diagram of an emergency police dispatch protocol of an emergency police dispatch system, according to one embodiment.

FIG. 2 is a high-level flow diagram of an emergency police dispatch protocol 108 of an emergency police dispatch system, according to one embodiment. The protocol 108 may begin with a case entry protocol 202 that guides the dispatcher in gathering initial information. One aim of the case entry protocol 202 is to obtain sufficient information from the person needing assistance to permit identification of a chief complaint. Also, the case entry protocol 202 may be considered a primary interrogation because all communications may be processed through the case entry protocol 202 to gather initial incident information. The information received through the case entry protocol 202 may include a location of the incident, communication identifiers and/or addresses, such as a call-back number in the event a call is disconnected, the person needing assistance's name, and a description of the incident.

If the dispatcher receives and enters information that an incident is especially critical (e.g., an active assailant, a person needing assistance in imminent danger, a sinking vehicle, a vehicle in rising flood water, or a stuck accelerator and cannot stop vehicle), for whatever reason, an emergency response is dispatched 204 immediately, before continuing with any further interrogation or instructions. The dispatched 204 emergency response may be a maximum emergency response, including properly trained law enforcement officers. The criticality of the incident 206 is verified and pre-arrival instructions are given 208. The pre-arrival instructions can be tailored to the specific incident and/or situation. Typically, a result of properly conveyed (by the dispatcher) and executed (by the person needing assistance) pre-arrival instructions may be a more calm, stable situation at the time the law enforcement emergency responders arrive, and/or reduced risk of injury or death for the person needing assistance. The pre-arrival instructions may aid to ensure safety and improve the effectiveness of the dispatched 204 emergency response.

If the dispatcher receives information from the person needing assistance to confirm the incident is not critical (e.g., not an imminent danger), but the dispatcher lacks sufficient information to proceed directly to a dispatch protocol 124, the emergency police dispatch protocol 108 may shunt to additional interrogations 210 designed to guide the dispatcher to gather information from the person needing assistance to enable the dispatcher to ascertain the chief complaint. If the chief complaint is determined, the emergency police dispatch protocol 108 may shunt to the appropriate dispatch protocol 124 for dealing with that chief complaint.

The dispatch protocol 124 may guide the dispatcher through a secondary interrogation focusing on the chief complaint. The dispatch protocol 124 may present a pre-scripted interrogation to enable a more orderly and detailed understanding of the incident that can be communicated to law enforcement emergency responders. The pre-scripted interrogation may include preprogrammed inquiries focused on gathering information relating to the chief complaint. The preprogrammed inquiries provided by the dispatch protocol 124 may be termed "Key Questions" for the particular situation or condition of the chief complaint. The preprogrammed inquiries presented may depend on responses from the person needing assistance. Verifying 206 the criticality of the incident and giving 208 pre-arrival instructions may include traversing the logic tree of the dispatch protocol 124. Dispatch protocols 124, in general, are discussed in greater detail below with reference to FIG. 4.

During the dispatch protocol 124, the dispatcher and/or the emergency police dispatch protocol 108 will gather information about the circumstances of the incident or emergency situation, discovered through interrogation, and may dispatch 214 an appropriate emergency dispatch response. The dispatch protocol 124 facilitates uniform and consistent gathering of information relating to the emergency and dispatching of an appropriate emergency dispatch response. The appropriate emergency dispatch response may be determined through a system of assigning determinant values as the protocol progresses (i.e., traverses) through a logic tree. The determinant values, as described above, may range, for example, from E-1 for generally very serious emergencies to $\Omega$-2 for generally less serious emergencies. In another embodiment, the determinant values may range from, for example, E-1 for generally very serious emergencies to A-2 for generally less serious emergencies. In still another embodiment, the determinant values may range differently, such as for example from A-1 for generally very serious emergencies to E-5 for generally less serious emergencies.

After the appropriate emergency dispatch response has been sent (e.g., law enforcement officers), the dispatcher may remain in communication with the person needing assistance to provide 216 post-dispatch instructions regarding what to do, and what not to do, prior to the arrival of law enforcement officers. The post-dispatch instructions help to stabilize the situation, and to expedite the work of law enforcement officers at the scene. Post-dispatch instructions may include, for example, "do not disturb anything at the scene, including weapons, tools, or objects found nearby," "stay on the line and I'll tell you exactly what to do next," and the like.

Figure 3:
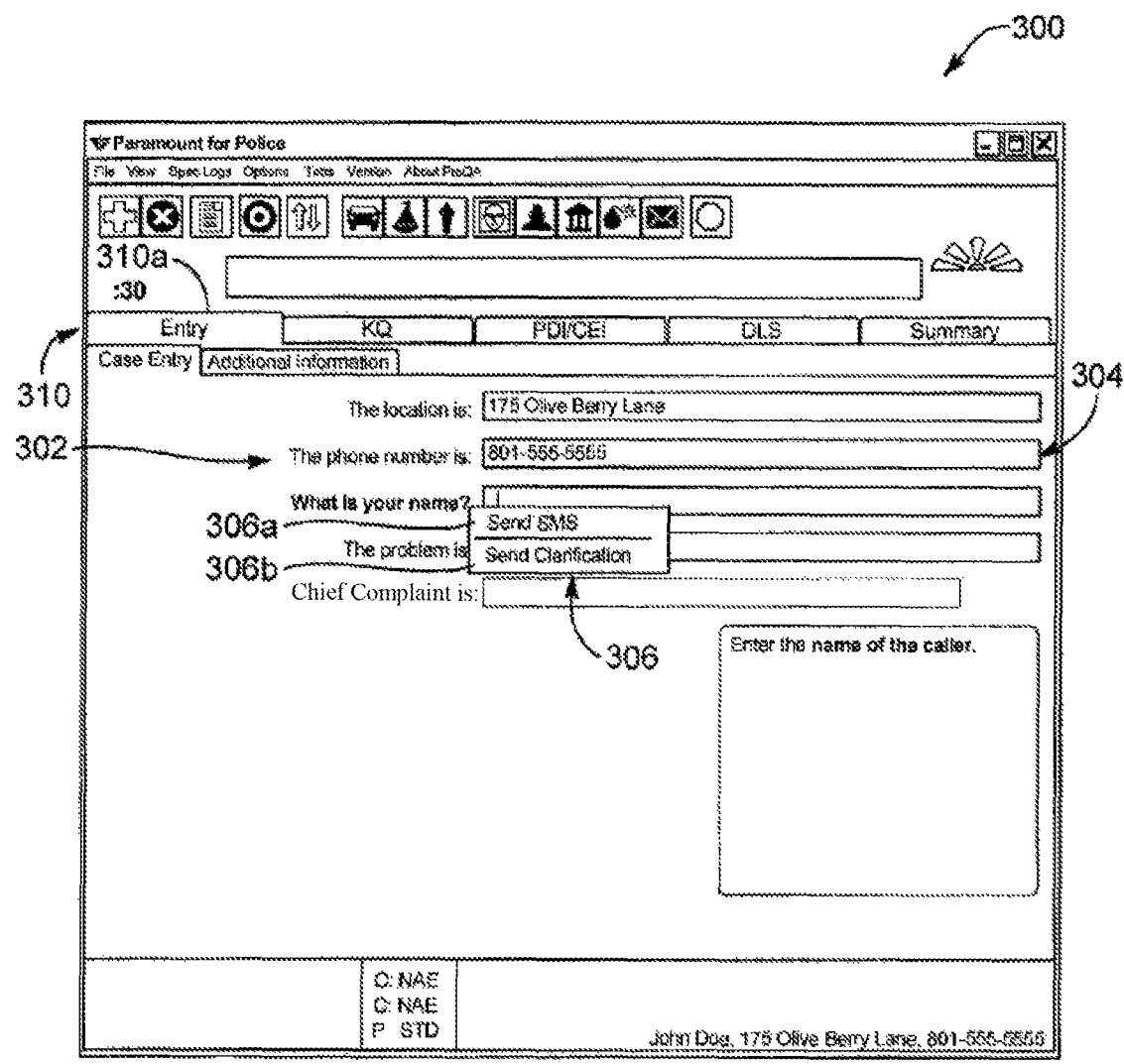
FIG. 3 is a user interface of an emergency police dispatch system, according to one embodiment.

FIG. 3 is a user interface 300 of an emergency police dispatch system, according to one embodiment. The emergency police dispatch system user interface 300 allows a dispatcher to interface with the emergency police dispatch protocol. The illustrated user interface 300 is shown traversing a case entry protocol 202 of the emergency police dispatch protocol 108 (described above with reference to FIG. 2). The emergency police dispatch protocol may present inquiries 302 (or questions) via the emergency police dispatch system user interface 300. The inquiries 302 are provided for the dispatcher to relay to the person needing assistance to gather information regarding the reported incident or emergency. The dispatcher and/or the emergency police dispatch system may gather the information in the form of responses to the inquiries 302 from the person needing assistance.

The dispatcher may input the responses of the person needing assistance to the inquiries into response fields 304 provided by the user interface 300. The response fields 304 may include, for example, any of a number of appropriate input field types, including but not limited to text fields, text boxes, menus, drop-down menus, drop-down selection boxes, lists, buttons, check boxes, radio buttons, and/or hybrid fields. For example, a text field for identifying the problem may allow for freeform input but also provide a list of suggestions to the dispatcher that can be inserted into the text field by clicking and/or double-clicking an entry in the list. The response fields 304 may correspond to information indicative of one or more responses to the inquiries 302 from the person needing assistance. In some embodiments, the inquiries 302 may change from an interrogative form to an assertional form after a response has been entered and/or when a cursor is not in the corresponding response field 304.

The responses from the person needing assistance are relayed from the person needing assistance to the dispatcher, for example, over the telephone or via an SMS/MMS message. Information from the responses of the person needing assistance may be input into the system by the dispatcher and may be used by the emergency police dispatch protocol to determine subsequent inquiries 302 and instructions to present to the dispatcher. The response information may indicate the person needing assistance's observations of the incident and/or current situation. The emergency police dispatch system may use the response information to generate an emergency police dispatch response by properly trained law enforcement officers. The information gathered from the responses of the person needing assistance may be used by the determinant value calculator to calculate a determinant value that can be communicated to the emergency responders. Additional details relating to emergency police dispatch protocols and user interfaces to interact with the same can be found in the earlier referenced U.S. patents. In addition, similar concepts are discussed below in relation to a dispatch protocol with reference to FIGS. 4 and 5.

The dispatcher may be able to send and/or receive SMS and/or MMS messages directly from the user interface 300. For example, in an embodiment, the dispatcher may be able to right-click one of the inquiries 302 and see an SMS menu 306. The SMS menu 306 may not be displayed if the dispatcher right-clicks on an area without text. The SMS menu 306 may provide a Send SMS option 306a. If the dispatcher clicks on the Send SMS option 306a, the preprogrammed inquiry may be sent to the person needing assistance without requiring any further action by the dispatcher. Accordingly, in an embodiment, any preprogrammed inquiry may be sent to a person needing assistance with only two clicks. In other embodiments, the dispatcher may be able to edit the preprogrammed inquiry before sending, and/or the dispatcher may be required to highlight the portion of the inquiry to be sent. The SMS menu 306 may also provide a Send Clarification option 306b, which may launch a freeform text box for allowing the dispatcher to send any message desired. Although the illustrated embodiment includes a context menu for sending messages, any of a number of appropriate inputs may be used to send messages, including but not limited to text fields, text boxes, menus, drop-down menus, drop-down selection boxes, lists, buttons, check boxes, and radio buttons. For example, a button with a picture of an envelope on it may be provided next to each of the preprogrammed inquiries 302 and/or in other locations of the user interface 300.

Information from received SMS/MMS messages may be quickly and easily imported into the response fields 304. For example, the received message may be displayed using a pop-up window (not shown), such as an always-on-top window, and the response in the received message may be imported by right-clicking the response fields 304 and/or the window and selecting from a context menu an option to import the response. Others methods of importing the response may be used, such as copy and paste. Alternatively, the user interface 300 may be aware of the last preprogrammed inquiry sent and may automatically deliver the received response in the corresponding response field. The user interface 300 may automatically proceed to the next question after the response is received and/or allow the dispatcher to edit the response before proceeding. Sent questions may be shortened using common abbreviations, and/or common abbreviations within responses may be written out when imported and/or delivered to the response fields 304. A dialog box and/or a field in the user interface (not shown) may display all messages sent and/or received and may include a time stamp for each message.

The user interface 300 may further comprise tabs 310 to aid in organizing and/or compartmentalizing various aspects of processing a communication. The tabs 310 may include a tab 310a for presenting a case entry protocol portion of an emergency police dispatch protocol (e.g., "Entry" tab). Other tabs 310 may include a tab for presenting a dispatch protocol portion of the emergency police dispatch protocol (e.g., a "KQ" tab or Key Questions tab), a tab for presenting post-dispatch instructions and/or critical EMD information (e.g., a "PDI/CEI" tab), a tab for dispatching life support (e.g., a "DLS" tab), and a tab summarizing the communication and/or processing of the communication (e.g., "Summary" tab). The KQ tab is discussed below with reference to FIG. 5.

Figure 4:
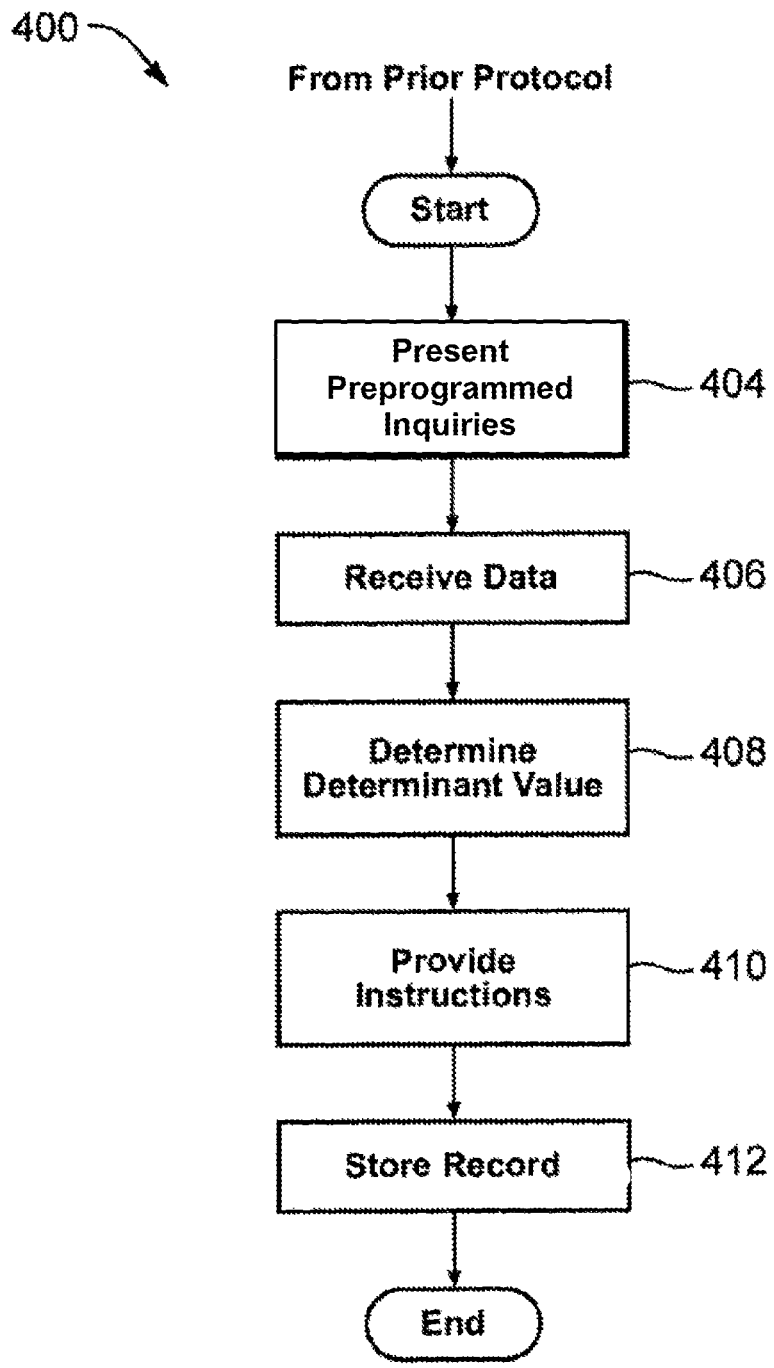
FIG. 4 is a high-level flow diagram of a method of a dispatch protocol for an emergency dispatch system, according to one embodiment.

FIG. 4 is a high-level flow diagram of a method 400 implemented by a dispatch protocol 124 (FIG. 1) for an emergency dispatch system, according to one embodiment. The dispatch protocol 124 facilitates uniform and consistent gathering of information relating to the reported chief complaint. Generally, but not always, sub-protocols within the dispatch protocol 124 for responding to specific incidents may initialize from a prior sub-protocol. The prior sub-protocol may be a case entry protocol, which may branch to a sub-protocol appropriate for handling the chief complaint of the communication once all or a portion of the case entry protocol has been traversed. In some instances the prior sub-protocol may be a different sub-protocol, from which a determination was made to shunt to a more appropriate sub-protocol. The determination to shunt may be made automatically by the prior sub-protocol or manually by the dispatcher.

The dispatch protocol may present 404 preprogrammed inquiries according to a pre-scripted interrogation. The preprogrammed inquiries may also be referred to as "Key Questions," targeted to ascertain the criticality of the incident or situation and typically are based on the chief complaint. The preprogrammed inquiries may be considered a part of a pre-scripted interrogation that is based on a logic tree of the dispatch protocol 124. The preprogrammed inquiries that are presented as part of a pre-scripted interrogation may depend on dispatcher-entered input. A pre-scripted interrogation may be considered to be a set of preprogrammed inquiries presented according to traversal of a path along the logic tree.

Data is received 406 from the dispatcher, as relayed from the person needing assistance, following the preprogrammed inquiries asked to the person needing assistance by the dispatcher. The data received 406 may correspond to responses from the person needing assistance to the preprogrammed inquiries. The data may be used to determine subsequent questions, or to determine instructions to provide to the dispatcher. The data may be received substantially in real time, as the dispatcher provides inputs the data. Alternatively, or in addition, the input may be received from the emergency police dispatch system because information sought by the dispatch protocol 124 may have previously been obtained from the dispatcher via the case entry protocol and/or another portion of the dispatch protocol 124. Alternatively, or in addition, the input may be received from a diagnostic tool. The dispatcher-entered input relates to the emergency communication and/or the reported incident. The dispatcher-entered input may affect the path along which the logic tree is traversed.

The received data is also used by the protocol to determine 408 a determinant value and/or update an already determined determinant value. Intermediate determinant values may be produced as information is received and processed, and the final determinant value may be determined after all information is received and processed. The dispatch protocol may provide 410 appropriate instructions to be relayed to the person needing assistance by the dispatcher. The instructions may comprise post-dispatch instructions for the person needing assistance to help stabilize or otherwise ameliorate a situation and to expedite the work of law enforcement officers at the scene. A database may be accessed to produce appropriate instructions. Records of the communications may be stored 412 for historical reports, for review and analysis of dispatcher performance, and for continued quality assurance control. A record of a communication may include, but is not limited to inquiries, responses, and determinant values.

As can be appreciated, some or all of the information gathered by the pre-scripted interrogation may not be used, for example, in calculating a determinant value. Similarly, some or all the information may not be communicated to the emergency responder law enforcement officers. However, the information gathered may be used, or stored for later use, by law enforcement and/or emergency dispatch services, for example, to review the response and/or identify ways to improve future responses.

As can also be appreciated, the spelling and/or sentence structure of the preprogrammed inquiries may vary according to the geographic location or region where the emergency police dispatch system may be deployed.

Figure 5:
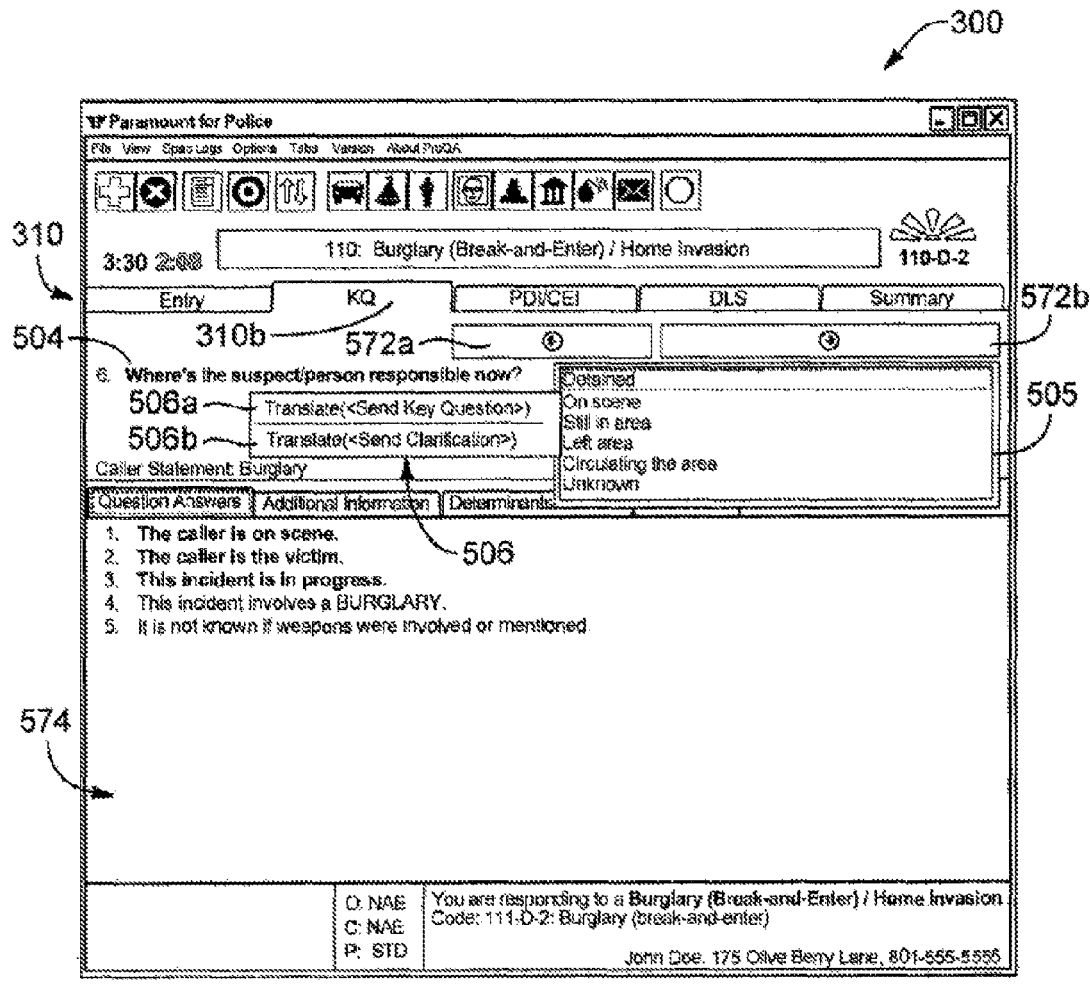
FIG. 5 is a user interface of an emergency police dispatch system as the emergency police dispatch system traverses a logic tree of a protocol for an emergency dispatch system.

FIG. 5 is a user interface 300 of an emergency police dispatch system as the emergency police dispatch system presents a pre-scripted interrogation, traversing one path of a logic tree of the dispatch protocol 124, according to one embodiment. As previously explained above, with reference to FIG. 3, the emergency police dispatch system user interface 300 allows a dispatcher to interface with the emergency police dispatch protocol.

The user interface 300 presents one or more tabs 310, including a tab 310b (e.g., a key questions or "KQ" tab) that is configured to present preprogrammed inquiries (e.g., key questions) as part of a pre-scripted interrogation of a dispatch protocol. The particular questions presented may depend on the dispatch protocol and the path along a logic tree of the dispatch protocol that may be traversed based on responses from the person needing assistance to the preprogrammed inquiries. Typically, but not always, the user interface 300 will present the tab 310b (e.g. a Key Questions or "KQ" tab) upon completion of the case entry protocol on tab 310a (i.e., the "Entry" tab"). If sufficient information is available to identify a chief complaint, the emergency police dispatch protocol may shunt to an appropriate dispatch protocol, present tab 310b, initialize the appropriate dispatch protocol, and traverse the appropriate dispatch protocol 124.

FIG. 5 illustrates the user interface 300 presenting a preprogrammed inquiry 504 "Where's the suspect/person responsible now?" for the dispatcher to relay to the person needing assistance. An input field 505 enables the dispatcher to quickly and easily enter input indicative of the person needing assistance's response to the preprogrammed inquiry 504. In the illustrated embodiment, the input field 505 provided is a list box presenting a list of acceptable inputs. As will be appreciated, the input field 505 may be any of a number of appropriate input field types, including but not limited to text fields, text boxes, menus, drop-down menus, drop-down selection boxes, lists, buttons, check boxes, and radio buttons. In FIG. 5, the list of acceptable inputs may include "Detained," "On scene," "Still in area," "Left area," "Circulating the area," and "Unknown." In FIG. 5, the input "Detained," is presently selected.

The dispatcher may be able to send an SMS and/or MMS message containing the preprogrammed inquiry 504. In some embodiments, the dispatcher may be able to right-click the preprogrammed inquiry 504, and an SMS menu 506 may be displayed. In an embodiment, the SMS menu 506 may be displayed only if the dispatcher right-clicks on the preprogrammed inquiry. The SMS menu 506 may provide a Translate (<Send Key Question>) option 506a, which may be clicked by the dispatcher. When selected, the Translate (<Send Key Question>) option 506a may automatically shorten and/or abbreviate the preprogrammed inquiry and/or may provide easy response options based on the expected answer. For example, either "suspect" or "person responsible" may be used instead of "suspect/person responsible." Also, the person needing assistance may be instructed to respond with a number code, such as "1" for detained, "2" for on scene, "3" for still in area, "4" for left area, "5" for circulating the area, and "6" for unknown. In other embodiments, alternative response options may be provided in addition or instead, such as the first letter of each answer or the like. The SMS menu 506 may also provide a Translate (<Send Clarification>) option 506b, to send a custom message, for example, to clarify the preprogrammed inquiry 504. As previously explained above, with reference to FIG. 3, the user interface 300 may provide other input methods to allow the dispatcher to send a message. Also, information other than preprogrammed inquiries, such as post-dispatch and/or pre-arrival instructions and/or inquiries and/or instructions from a diagnostic tool 120 (FIG. 1), may be sent via SMS and/or MMS message using the user interface 300, for example, by right-clicking and selecting an option to send the instruction as an SMS and/or MMS message.

When a response is received, an answer in the input field 505 may be selected automatically. For example, if the person needing assistance is instructed to reply with a number corresponding to the answer, the user interface 300 may automatically select an answer in the input field 505 corresponding to the number received. The user interface 300 may automatically proceed to the next preprogrammed inquiry, and/or the answer may be highlighted to allow the dispatcher to proceed quickly by single-clicking or hitting the space or Enter key. For preprogrammed inquiries accepting freeform answers, the entire SMS/MMS message may be automatically used as the response. Alternatively, the dispatcher may be required to read the response and to select the corresponding answer even if a number code is used and/or to select the text to be included in a freeform answer. In response to some preprogrammed inquiries, the person needing assistance may find it simpler to send an MMS message, such as a picture or video. For example, a preprogrammed inquiry may ask for the suspect's description, and the person needing assistance may be able to send a picture or video showing the suspect's current appearance. The dispatcher may be able to copy and paste the received multimedia item into the answers and/or save the received multimedia item to the case. In some embodiments, received multimedia items and/or all SMS/MMS messages sent and/or received may be automatically saved to the case and/or inserted into the answers.

The user interface 300 may present navigation buttons 572a, 572b to enable the dispatcher to indicate to the user interface 300 to navigate back or forward, respectively, in the emergency dispatch protocol. The dispatcher can select the forward navigation button 572b to indicate to the user interface 300 that the dispatcher is ready to proceed in the protocol. The dispatcher can select the back navigation button 572a to go back in the protocol. Accordingly, when the dispatcher selects the forward navigation button 572b, the protocol advances and the user interface 300 may present a next instruction and/or preprogrammed inquiry.

The user interface 300 may also present an answers pane 574 to display input received in relation to previous instructions and/or preprogrammed inquiries. For example, the answers pane 574 of FIG. 5 displays the dispatcher-entered input provided for multiple previously presented preprogrammed inquiries and/or instructions presented by the dispatch protocol 124; e.g., "1. The caller is on scene. 2. The caller is the victim . . . 5. It is not known if weapons were involved or mentioned." The answers pane 574 enables a dispatcher to quickly review previous responses for accuracy and to thereby improve understanding of the situation and/or incident reported by the person needing assistance. If the dispatcher were to inadvertently select an incorrect input in the input field 505, the dispatcher can readily recognize the error in the answers pane 574 and navigate back in the protocol by selecting the back navigation button 572a and then select a correct input.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

The invention claimed is:

1. An automated emergency dispatch system, comprising:
   an electronic display;
   a communication device configured to send short message service (SMS) messages, multimedia messaging service (MMS) messages, or a combination thereof;
   one or more input devices; and
   an emergency dispatcher computing device, comprising:
   one or more processors electrically coupled to the electronic display, the one or more input devices, and the communication device; and
   a memory device electrically coupled to the one or more processors, the memory device including computer-readable instructions stored thereon, the computer-readable instructions configured to instruct the one or more processors to:
   cause the electronic display to display a plurality of preprogrammed inquiries for an emergency dispatcher operating the automated emergency dispatch system to present to a person needing assistance; and
   cause the communication device to automatically transmit at least one of the plurality of preprogrammed inquiries displayed by the electronic display to a device of the person needing assistance as one of an SMS message and an MMS message responsive to detecting an input from the emergency dispatcher with the one or more input devices without the emergency dispatcher copying and/or transcribing the at least one of the plurality of preprogrammed inquiries.

2. The automated emergency dispatch system of claim 1, wherein the memory device includes data corresponding to the preprogrammed inquiries stored thereon.

3. The automated emergency dispatch system of claim 1, wherein the memory device includes data corresponding to a logic tree stored thereon, and the computer-readable instructions are configured to process responses of the person needing assistance according to predetermined logic of the logic tree.

4. The automated emergency dispatch system of claim 3, wherein the computer-readable instructions are configured to cause the electronic display to provide the emergency dispatcher information concerning an emergency dispatch response determined based, at least in part, on the responses of the person needing assistance and the predetermined logic of the logic tree.

5. The automated emergency dispatch system of claim 3, wherein the computer-readable instructions are configured to cause the electronic display to provide the emergency dispatcher post-dispatch instructions for relay to the person needing assistance before professional help arrives at a location of the person needing assistance based, at least in part, on the responses of the person needing assistance and the predetermined logic of the logic tree.

6. The automated emergency dispatch system of claim 3, wherein the computer-readable instructions are configured to cause the electronic display to provide information to aid the emergency dispatcher in determining a priority of an emergency communication between the emergency dispatcher and the person needing assistance based, at least in part, on the responses of the person needing assistance and the predetermined logic of the logic tree.

7. The automated emergency dispatch system of claim 6, wherein the priority of the emergency communication includes one of a priority of the emergency communication relative to other emergency communications and a level of emergency response to provide for a situation reported by the person needing assistance.

8. The automated emergency dispatch system of claim 1, wherein the at least one of the plurality of preprogrammed inquiries are automatically transmitted to the device of the person needing assistance responsive to no more than two actions by the emergency dispatcher.

9. The automated emergency dispatch system of claim 8, wherein the no more than two actions comprise a selection by the emergency dispatcher of the at least one of the plurality of preprogrammed inquiries to bring up a menu on the electronic display, and selecting a send SMS command in the menu by the emergency dispatcher using the one or more input devices.

10. The automated emergency dispatch system of claim 8, wherein the no more than two actions comprise no more than two single key-strokes on the one or more input devices by the emergency dispatcher.

11. A method of operating an emergency dispatcher computing device, the method comprising:
displaying, on an electronic display, preprogrammed inquiries for an emergency dispatcher operating the emergency dispatcher computing device to inquire of a person needing assistance;
detecting a selection of one of the preprogrammed inquiries by the emergency dispatcher; and
automatically transmitting one of a short message service (SMS) message and a multimedia messaging service (MMS) message including the selected one of the preprogrammed inquiries to a device of the person needing assistance without the emergency dispatcher copying and/or transcribing the at least one of the plurality of preprogrammed inquiries.

12. The method of claim 11, wherein automatically transmitting one of an SMS message and an MMS message including the selected one of the preprogrammed inquiries comprises shortening the selected one of the preprogrammed inquiries prior to sending the one of the SMS message and the MMS message by replacing one or more words of the selected one of the preprogrammed inquiries with common abbreviations.

13. The method of claim 11, further comprising receiving a responsive message comprising one of an SMS message and an MMS message from the device of the person needing assistance, the responsive message responding to the selected one of the preprogrammed inquiries transmitted to the device of the person needing assistance.

14. The method of claim 13, wherein the responsive message includes a single character indicating one of a "yes" response and a "no" response to the selected one of the preprogrammed inquiries transmitted to the device of the person needing assistance.

15. The method of claim 14, wherein a single character indicating a "yes" response comprises a "1" character, and a single character indicating a "no" response comprises a "2" character.

16. The method of claim 13, further comprising logging all SMS/MMS messages sent and received by the computing device to a persistent storage device.

17. The method of claim 11, further comprising determining a determinant value from responses of the person needing assistance to the preprogrammed inquiries, the determinant value indicating a determined level of seriousness of a situation of the person needing assistance.

18. The method of claim 17, wherein the determinant value indicates a determined level of seriousness ranging between a generally very serious emergency and a generally less serious emergency.

19. The method of claim 17, wherein the determinant value is a combination of a determinant level, indicated by one of Alpha A, Bravo B, Charlie C, Delta D, Echo E, and Omega $\Omega$, and a numeric value, indicated by one of "1" and "2," with $\Omega$-2 being the least serious and E-1 being the most serious.

20. A non-transitory computer-readable storage medium including computer-readable instructions stored thereon, the computer-readable instructions configured to instruct at least one processor to perform a method, the method comprising:
causing an electronic display, during an emergency call between a person needing assistance and an emergency dispatcher, to display preprogrammed inquiries for the emergency dispatcher to inquire of the person needing assistance;
accepting one or more inputs from the emergency dispatcher indicating one or more of the preprogrammed inquiries; and
automatically transmitting the selected one or more of the preprogrammed inquiries to a device of the person needing assistance in one of a short message service (SMS) message and a multimedia messaging service (MMS) message without the emergency dispatcher copying and/or transcribing the selected one or more of the preprogrammed inquiries.

* * * * *